United States Patent [19]

Tiedemann, Jr. et al.

[11] Patent Number: 5,509,015

[45] Date of Patent: Apr. 16, 1996

[54] METHOD AND APPARATUS FOR SCHEDULING COMMUNICATION BETWEEN TRANSCEIVERS

[75] Inventors: Edward G. Tiedemann, Jr.; Lindsay A. Weaver, Jr.; Richard J. Kerr, all of San Diego; Kenneth M. Geib, Encinitas, all of Calif.

[73] Assignee: Qualcomm Incorporated, San Diego, Calif.

[21] Appl. No.: 206,701

[22] Filed: Mar. 7, 1994

Related U.S. Application Data

[63] Continuation of Ser. No. 847,149, Mar. 5, 1992, Pat. No. 5,392,287.

[51] Int. Cl.[6] ........................................... H04J 3/16
[52] U.S. Cl. ........................................ 370/95.3; 370/95.10
[58] Field of Search .................................. 370/95.1, 95.2, 370/95.3, 50, 105.1, 94.1, 100.1, 103, 85.2, 94.2, 84, 13, 18, 105.5; 455/33.1, 33.2, 33.3, 33.4, 56.1, 34.1, 34.2, 38.3, 13.4, 343, 89; 379/60, 63, 59, 343; 375/200, 205, 359, 354, 355, 356, 364, 365

[56] References Cited

U.S. PATENT DOCUMENTS 4,597,077  6/1986  Nelson et al. ...................... 370/60
4,891,805  2/1990  Fallin ................................ 370/95.1
5,175,874  12/1992  Auchter ............................ 455/89

*Primary Examiner*—Douglas W. Olms
*Assistant Examiner*—Dang Ton
*Attorney, Agent, or Firm*—Russell B. Miller; Katherine W. White

[57] ABSTRACT

A system for reducing receiver power consumption in communication system having a transmitter and one or more receivers schedules periodic messages in "slots." Each receiver is assigned a slot during which it monitors the transmissions. The transmitter transmits messages to the receiver only during the assigned slots. The receiver is in an "active state" during its assigned slot. It may remain in the active state after its assigned slot if the message requires the receiver to perform additional actions. During the "inactive state," which is the time period between successive occurrences of its assigned slot, the receiver may perform any action not requiring coordination with the transmitter. It may conserve power during this time by removing power from one or more components such as those used for monitoring the transmissions. At a time during the inactive state shortly before the assigned slot, the receiver applies power to these components and performs initializations. Such initializations may include reacquiring a pilot channel signal to which the receiver may synchronize itself if its timing signals have drifted out of synchronization with those of the transmitter during the preceding inactive state.

37 Claims, 6 Drawing Sheets

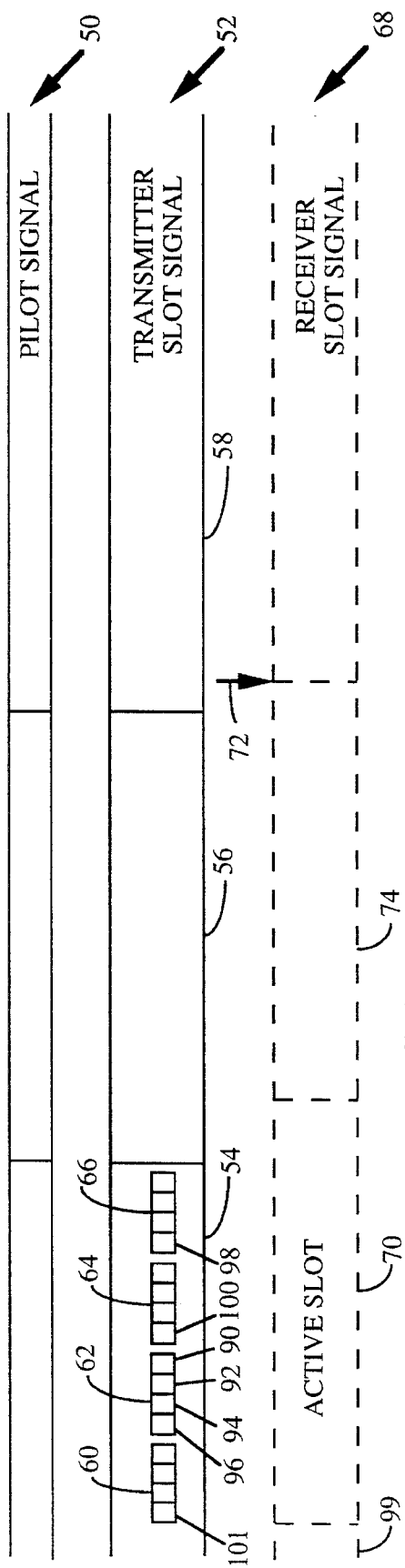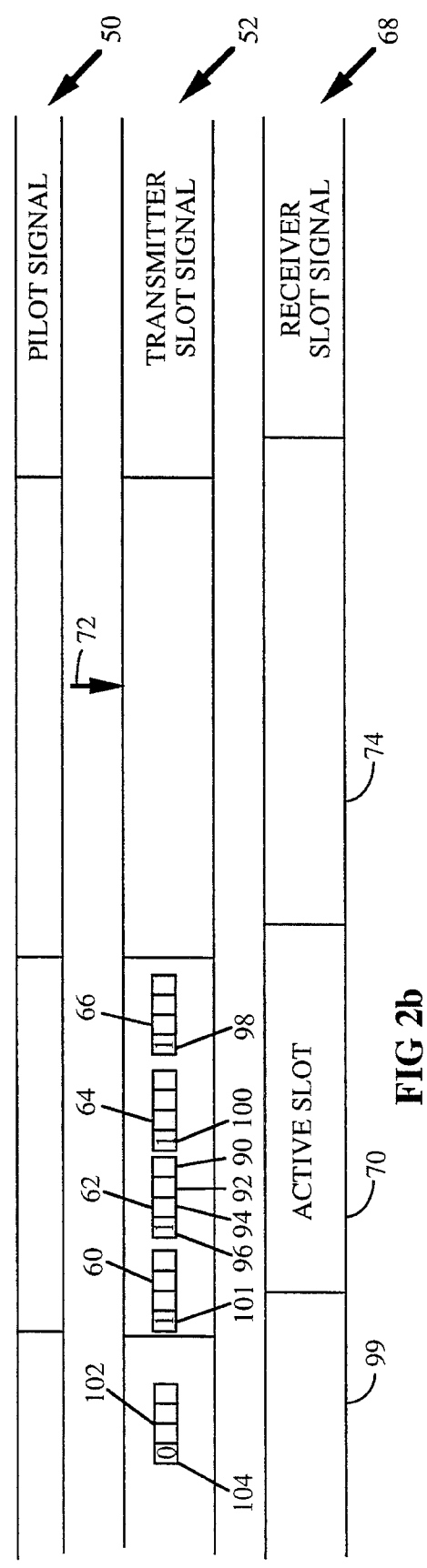
FIG. 2a
FIG 2b

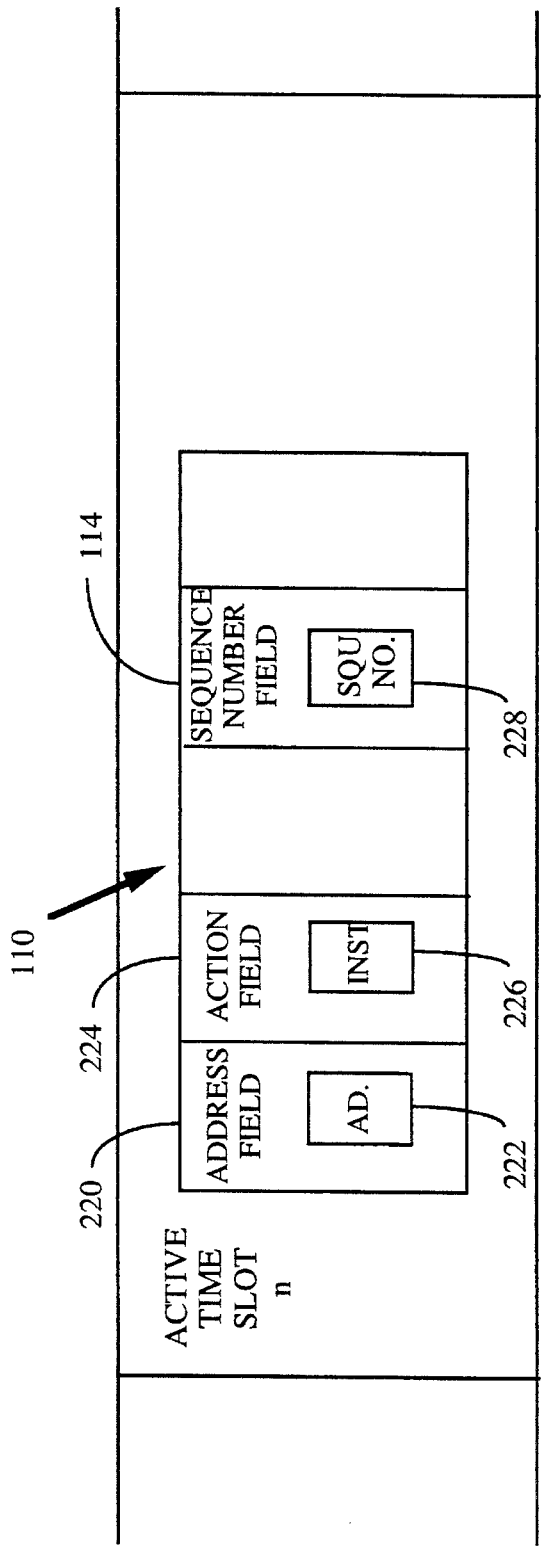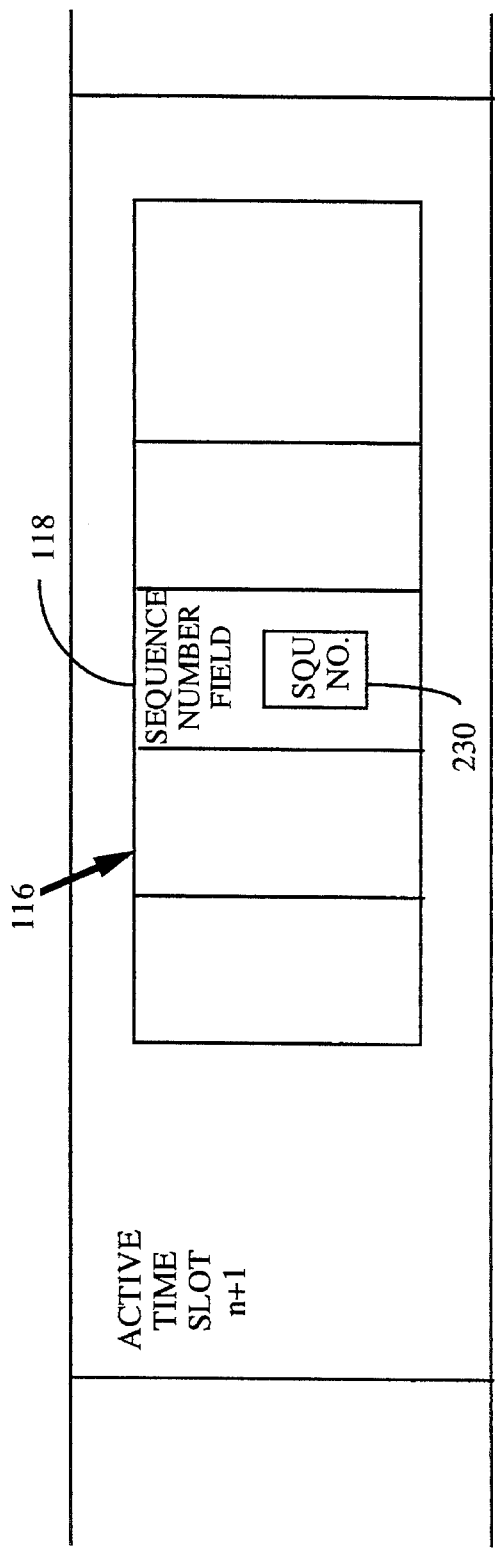

METHOD AND APPARATUS FOR SCHEDULING COMMUNICATION BETWEEN TRANSCEIVERS

This is a continuation of application Ser. No. 07/847,149, filed Mar. 5, 1992, now U.S. Pat. No. 5,392,287 issued Feb. 21, 1995.

BACKGROUND OF THE INVENTION

The present invention relates to mobile communications systems such as cellular telephone systems and, more specifically, to a system for reducing power consumption in a mobile or portable transceiver of such a system.

In many communications systems, the transceivers are only sporadically active. For example, a cellular telephone remains idle for significant periods of time when no call is in progress. During such idle periods the cellular telephone consumes substantially the same amount of power as during active periods. However, to ensure that a transceiver receives sporadically transmitted messages, it must continuously monitor a channel. In a digital cellular telephone system, such as that described in U.S. Pat. No. 5,056,031 entitled "Method and Apparatus for Controlling Transmission Power in a CDMA Cellular Telephone System" and copending U.S. patent application Ser. No. 07/543,496 entitled "System and Method for Generating Signal Waveforms in a CDMA Cellular Telephone System," both assigned to the assignee of the present invention, messages transmitted by a base station may include those for alerting the mobile station to the presence of an incoming call and those for periodically updating system parameters in the mobile station.

While a mobile station installed in a vehicle may be powered by the vehicle's electrical system, prolonged use of the mobile station when the vehicle is not operating may drain the vehicle's battery. Furthermore, many mobile stations are portable and powered by an internal battery. Personal Communications Systems (PCS) handsets are almost exclusively battery powered. In any such stations it is desirable to minimize power consumption to increase battery life.

A mobile station may consume significant amounts of power by continuously monitoring the channel for incoming messages. The resulting power drain on the battery reduces the time available for actively handling calls. A system that reduces power consumption by periodically monitoring the channel for incoming messages during idle periods would be highly desirable. These problems and deficiencies are clearly felt in the art and are solved by the present invention in the manner described below.

SUMMARY OF THE INVENTION

The present invention reduces receiver power consumption in a communication system having a transmitter communicating with one or more remote receivers on a channel. Each receiver periodically enters an "active state" during which it can receive messages on the channel. The transmitter sends one or more messages to each receiver during each successive occurrence of the active state of the receiver. Although we generally refer herein to a single receiver, it is understood that more than one such receiver in a system may be active simultaneously. During the "inactive state" of a receiver, the time period between successive active states, the transmitter does not send any messages to that receiver, although it may send messages to other receivers in the system that are in the active state. In the inactive state, the receiver may perform any action not requiring coordination with the transmitter. The receiver may use the inactive state to reduce its power consumption by removing power from one or more components, such as those components used for monitoring the channel.

The channel is divided in the time dimension into a continuous stream of "slots." The receiver has a "slot cycle," which comprises two or more slots. The receiver is assigned one slot of its slot cycle during which it must monitor the channel. The receiver is generally in the active state only during its assigned slot and in the inactive state during the remainder of its slot cycle. However, if the message itself directs the receiver to perform some further action, it must remain in the active state until it completes the action.

The transmitter and receiver slot timing should be aligned in the time dimension to ensure that transmitted messages are not lost but are received in the assigned slot. In certain embodiments, the transmitter and receiver slot timing may be continuously synchronized. However, in other embodiments, the receiver may operate independently during the inactive state and some timing drift may occur relative to the transmitter. In such embodiments, the receiver may periodically synchronize its slot timing to that of the transmitter.

In a digital cellular telephone system, for example, the receiver may acquire and track a pilot signal that the transmitter provides on a separate pilot channel. In the inactive state, the receiver may conserve power by removing power from the pilot signal tracking circuitry during the inactive state. In the inactive state, the receiver may maintain its slot timing using an internal clock source. A short time before the next occurrence of its assigned slot, the receiver may apply power to this circuitry and reacquire the pilot signal. The receiver may then realign its timing with that of the transmitter by synchronizing it to the pilot signal. In addition to applying power and reacquiring a pilot signal, the receiver may perform any other actions or initializations to prepare it to receive a message at the beginning of its assigned slot.

Each message may also contain a field indicating whether another message is forthcoming. If an additional message is forthcoming, the receiver remains in the active state into the next slot. If there are no additional messages, the receiver may immediately enter the inactive state for the remainder of the slot cycle.

In a system having multiple receivers, each receiver is pseudorandomly assigned a slot in its slot cycle. An identification number uniquely associated with the receiver may be provided to a hash function, which pseudorandomly produces the assigned slot number.

All receivers in the system need not have the same slot cycle. Furthermore, the slot cycle of a receiver may change during operation. For example, the receiver may select a new slot cycle and send a message to the transmitter notifying it of the new slot cycle. Although either the receiver or transmitter may change the slot cycle of the receiver, both must have the slot cycle information.

The foregoing, together with other features and advantages of the present invention, will become more apparent when referring to the following specification, claims, and accompanying drawings.

BRIEF DESCRIPTION OF THE DRAWINGS

For a more complete understanding of our invention, we now refer to the following detailed description of the embodiments illustrated in the accompanying drawings, wherein:

FIGS. 2a–d illustrate the timing relationship between transmitter slot signals and receiver slot signals at successive points in time;

FIGS. 5a–b illustrate a message having a sequence number field.

DESCRIPTION OF THE PREFERRED EMBODIMENTS

Figure 1:
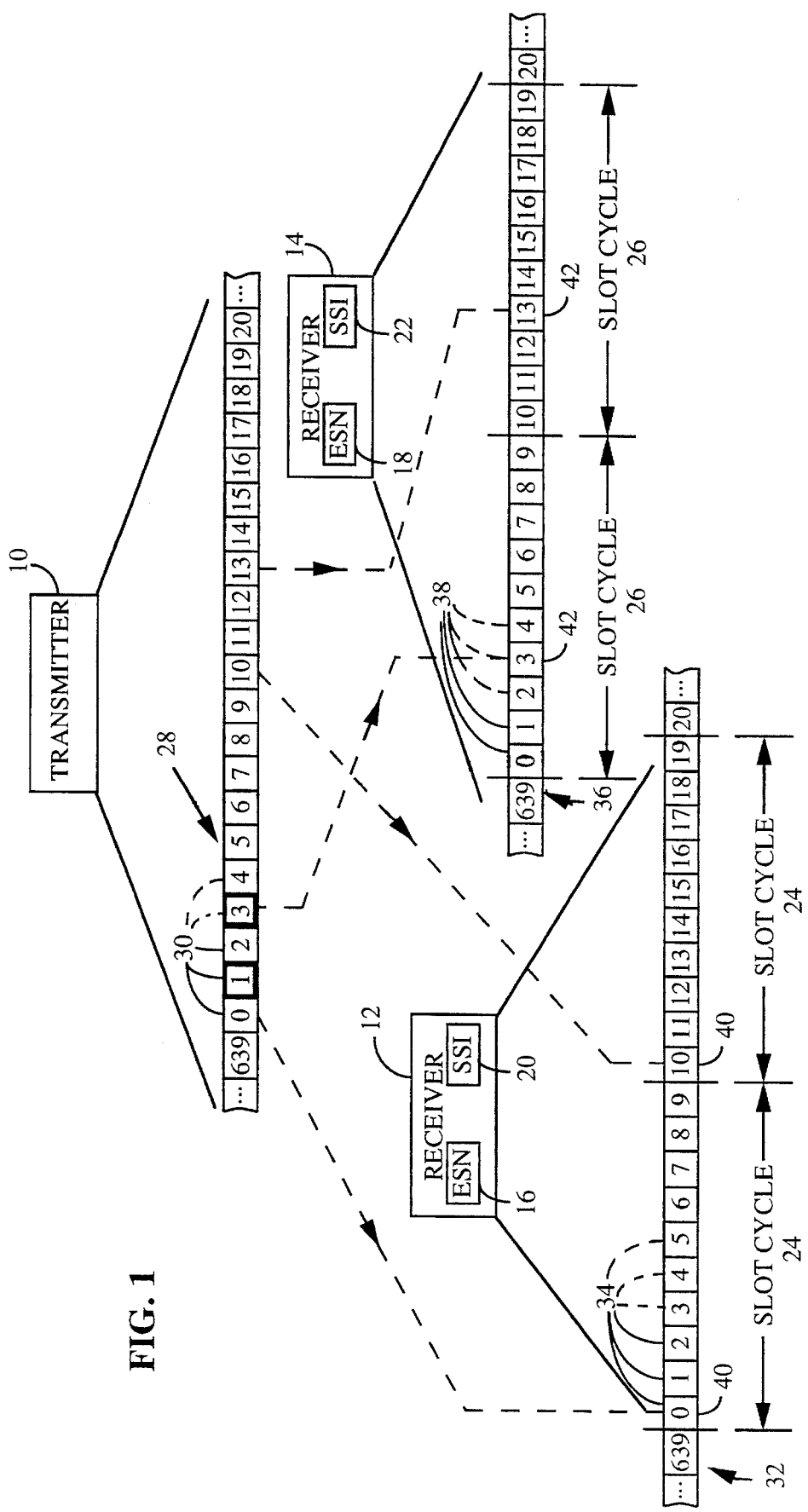
FIG. 1 illustrates the slotted transmission of messages in an embodiment of the present invention having a transmitter and two receivers.

In FIG. 1, a transmitter 10 may send messages to two receivers 12 and 14. Other embodiments may have a greater or lesser number of receivers. In a digital cellular telephone system such as discussed in the abovereferenced U.S. Patent and copending application, transmitter 10 is disposed in a base station or cell site (not shown) and transmits messages to receivers 12 and 14, disposed in mobile stations (not shown). The mobile stations may be cellular telephones or personal communications system (PCS) handsets.

The base station transmits these messages, which may provide the mobile station with an indication of an incoming telephone call, with a requirement to take special control actions, or with updated system parameters, on a "paging" channel. The paging channel transmissions are represented by the broken lines in FIG. 1.

Receivers 12 and 14 have 32-bit electronic serial numbers (ESN) 16 and 18, respectively. The ESN of each receiver is different from that of all other receivers. In a cellular telephone system, a call to a cellular telephone is routed to a mobile telephone switching office (MTSO, not shown). The MTSO in turn routes the call to a base station within transmitting range of the mobile station. Either the MTSO or the base station includes means for converting the telephone number of the cellular telephone into the mobile station ESN.

During a mobile station initialization or "registration" as it is known in the cellular communications art, or at other times as required, receivers 12 and 14 each select a slot cycle index 20 and 22 respectively. Slot cycle indices 20 and 22 determine the length of the slot cycles 24 and 26 of receivers 12 and 14 respectively. A processor in a mobile station may select a slot cycle index using an algorithm or it may use a predetermined value. For example, both slot cycle indices 20 and 22 have the value "1" in FIG. 1. A range of 1–7 is preferred for slot cycle indices 20 and 22. Thus, the maximum slot cycle index, MAX_SSI is "7." A value of "0" may be chosen to indicate that a receiver will continuously monitor the channel, i.e., the slotted communication method of the present invention will be bypassed. In a cellular telephone system, each mobile station transmits the slot cycle index selected by its receiver to the base station, which requires this information to access the receivers.

Receivers 12 and 14 compute slot cycles 24 and 26, which are $5 \times 2^{(slot\ cycle\ index\ 20)}$ and $5 \times 2^{(slot\ cycle\ index\ 22)}$ slots in length respectively. Transmitter 10 generates timing 28, which comprises a stream of periodic slots 30. Similarly, receiver 12 generates timing 32, which comprises a stream of periodic slots 34, and receiver 14 generates timing 36, which comprises a stream of periodic slots 38. Slots 30, 34, and 38 are equal in length and are preferably 200 milliseconds (ms) in length. Thus, using a range of slot cycle indices of 1–7 in the above function yields a range of slot cycles of between 10 and 640 slots in length, which corresponds to a time range of between 2 and 128 seconds using 200 ms slots.

Receiver 12 monitors the channel during an active slot 40, which occurs once in each slot cycle 24. Receiver 14 monitors the channel during an active slot 42, which occurs once in each slot cycle 26. Assigned slots are pseudorandomly selected to facilitate their even distribution among the slots of a slot cycle having a given length. Although many pseudorandom methods for selecting assigned slots are suitable, a method using Equations 1 and 2, below, is preferred.

Equations 1 and 2 may be used by transmitter 10 and receivers 12 and 14 to determine the periodic points in time, relative to "system time," at which assigned slots occur. At the beginning of system time, the first slot ($slot_0$) of each possible slot cycle occurred simultaneously. System time may be the current value of a counter (not shown) in each transmitter 10 and receiver 12 and 14. Such a counter (not shown) can run for thousands of years without repeating if it has a sufficiently large number of bits, and can easily be constructed by one skilled in the art. In addition, transmitter 10 may synchronize its counter (not shown) to a universal broadcast time source, such as that produced by the Global Positioning System (GPS). Receivers 12 and 14 synchronize their counters (not shown) to that of transmitter 10, as discussed below.

$$PGSLOT = \lfloor 5 \ 2^{MAX\_SSI} \times ((40503 \times (L \oplus H \oplus D)) \bmod 2^{16})/2^{16} \rfloor \quad (1)$$

where:

MAX_SSI is the maximum slot cycle index;

L is the least significant 16 bits of the ESN;

H is the most significant 16 bits of the ESN;

D is a number 6 times the least significant 12 bits of the ESN;

$\lfloor X \rfloor$ represents the largest integer less than or equal to X;

$\oplus$ represents a bitwise exclusive-OR operation; and all other operations are integer arithmetic.

Equation 1 may be solved for PGSLOT, which represents the time at which the assigned slot occurs as measured from the beginning of the slot cycle of maximum length. Equation 2, below, relates this time to system time. Receiver 12 uses ESN 16 to calculate its PGSLOT and receiver 14 uses ESN 18. Note that PGSLOT has a maximum value of $5 \times 2^{MAX\_SSI}$ slots ($2^{MAX\_SSI}$ seconds). However, receivers 12 and 14 may choose shorter slot cycles, as exemplified by FIG. 1 where both slot cycle 24 and 26 are 10 slots (2 seconds) in length.

Active slots 40 and 42 occur periodically within slot cycles 24 and 26, respectively. Equation 2 below may be used to determine when active slots 40 and 42 occur relative to system time.

$$(N - PGSLOT) \bmod (5 \times 2^{SSI}) = 0 \quad (2)$$

In Equation 2, N is the current slot. As discussed above, the first slot of all possible slot cycles occurs at the beginning of system time, i.e., when N equals zero. Receivers 12 and 14 each substitute slot cycle indices 20 and 22 respectively for SSI in Equation 2. The value of PGSLOT is also unique to each receiver 12 and 14 because it is derived from ESN 16 and 18, respectively. Receivers 12 and 14 each may compute Equation 2 once each slot cycle and, if true, monitor the channel for incoming messages because current slot is active slot 40 or 42, respectively. Of course, receivers 12 and 14 need not compute Equation 2 each slot cycle. Receivers 12 and 14 may compute Equation 2 at some initial point in time and, upon Equation 2 being true, may thereafter monitor the channel periodically at intervals of slot cycle 24 and slot cycle 26.

The computations discussed above in reference to mobile station receivers 12 and 14 are also performed by base station transmitter 10. For example, when a caller dials a telephone number associated with a mobile station, the MTSO routes the call to a base station in the vicinity of the mobile station. The base station retrieves the ESN and slot cycle of the mobile station by providing a lookup table with the telephone number. The base station computes the assigned slot in which it must transmit to the mobile station using Equations 1 and 2. When the base station slot timing generates the assigned slot, the transmitter sends a message that indicates the presence of an incoming call to the mobile station.

When mobile station receiver 12, for example, selects slot cycle index 20, it transmits the value selected to the base station on another channel (not shown). The base station acknowledges the selection by transmitting an acknowledgement message to mobile station receiver 12. Transmitter 10 begins using the newly selected slot cycle index after transmitting the acknowledgement. However, if receiver 12 does not receive such an acknowledgement because of a transmission error, receiver 12 will continue to use the old slot cycle index. Messages may be lost if transmitter 10 does not compute the active slots of receiver 12 using the same slot cycle index that receiver 12 uses to compute its active slot. To facilitate recovery from such an error, receiver 12 selects a default slot cycle index of "1" if it does not receive an acknowledgement. A slot cycle index of "1" ensures that an active slot as computed by transmitter 10 will coincide with an assigned slot as computed by receiver 12. Actually all that is required is that the receiver uses a slot cycle index less than or equal to that of the transmitter for the slots to line up.

Slot timing 28 of base station transmitter 10 is synchronized to slot timing 32 during transmission of messages to mobile station receiver 12 and to slot timing 36 during transmission of messages to mobile station receiver 14. Transmitter 10 synchronizes slot timing 28 to its system time counter (not shown).

The timing relationship between a base station transmitter and a mobile station receiver is shown in FIGS. 2a–2d. FIGS. 2a–2d represent successive "snapshots" in time and show a portion of the transmitter and receiver signals at these successive points in time. Note that the arrow 72 is simply a fixed point in time that serves as a common reference point for facilitating comparison of the signals throughout FIGS. 2a–2d. The signals can be thought of as moving in time from left to right towards arrow 72, as though on conveyor belts.

In FIG. 2a, a base station transmitter, such as base station transmitter 10 of FIG. 1, transmits a pilot signal 50, synchronized to the system clock, on a separate pilot channel. Base station transmitter 10 synchronizes transmitter slot signal 52, which has slots 54, 56, and 58, to pilot signal 50. Although pilot signal 50 is shown as having the same period as slots 54, 56, and 58, it may be any type of signal from which such a periodic signal could be derived. Slot 54 has messages 60, 62, 64, and 66. Although at least one message must be transmitted in each slot, the maximum number of messages that may be transmitted in a slot is limited only by the transmission rate and slot length.

FIG. 2a shows the signals at a point in time during which the receiver is in the inactive state. Receiver slot signal 68 is shown in broken lines to represent the inactive state because in the inactive state the receiver may conserve power by removing power from circuitry (not shown) that monitors the channel for messages. It may also remove power from circuitry (not shown) that tracks pilot signal 50. It is emphasized that the receiver may perform any action in the inactive state that does not require coordination with the transmitter.

As shown in FIG. 2a, receiver slot signal 68 may not be precisely aligned with transmitter slot signal 52 because in the inactive state the receiver is not tracking pilot signal 50 to which it could otherwise synchronize slot signal 68. However, the maximum time by which these signals may drift apart is substantially less than one slot.

Slot 70 is the active slot of the receiver and may correspond to active slot 40 or 42 of FIG. 1. The transmitter will send a message at the point in time when the first message, message 66, reaches arrow 72. The transmitter timing may determine this point by counting slots of the slot cycles from the beginning of system time. For example, slot zero occurred for the first time at the beginning of system time and repeats with a periodicity of the slot cycle. Although the receiver timing may have drifted slightly from the transmitter timing during the preceding inactive state, they are synchronized long before the occurrence of the next slot. Typically the drift is only about 2 microseconds for a receiver using a slot cycle of 2 seconds. Therefore, the receiver can determine the point in time at which it may expect to receive a message, i.e., arrow 72, with a precision well within a single slot. It can thus begin to transition to the active state shortly before this occurrence.

FIG. 2b shows the same signals at a point in time later than that of FIG. 2a. At a point in time between that of FIG. 2a and that of FIG. 2b, the receiver began the transition to the active state and applied power to the circuitry that tracks pilot signal 50. It is preferred that the transition begin after the beginning of slot 74, the slot preceding active slot 70, has reached arrow 72. However, the transition may begin at an earlier time. During the transition state, the receiver may apply power to circuitry, perform hardware resets, perform initialization routines, reacquire pilot signal 50, synchronize signals, or perform any action necessary to prepare it to receive messages in active slot 70 at arrow 72.

Figure 4:
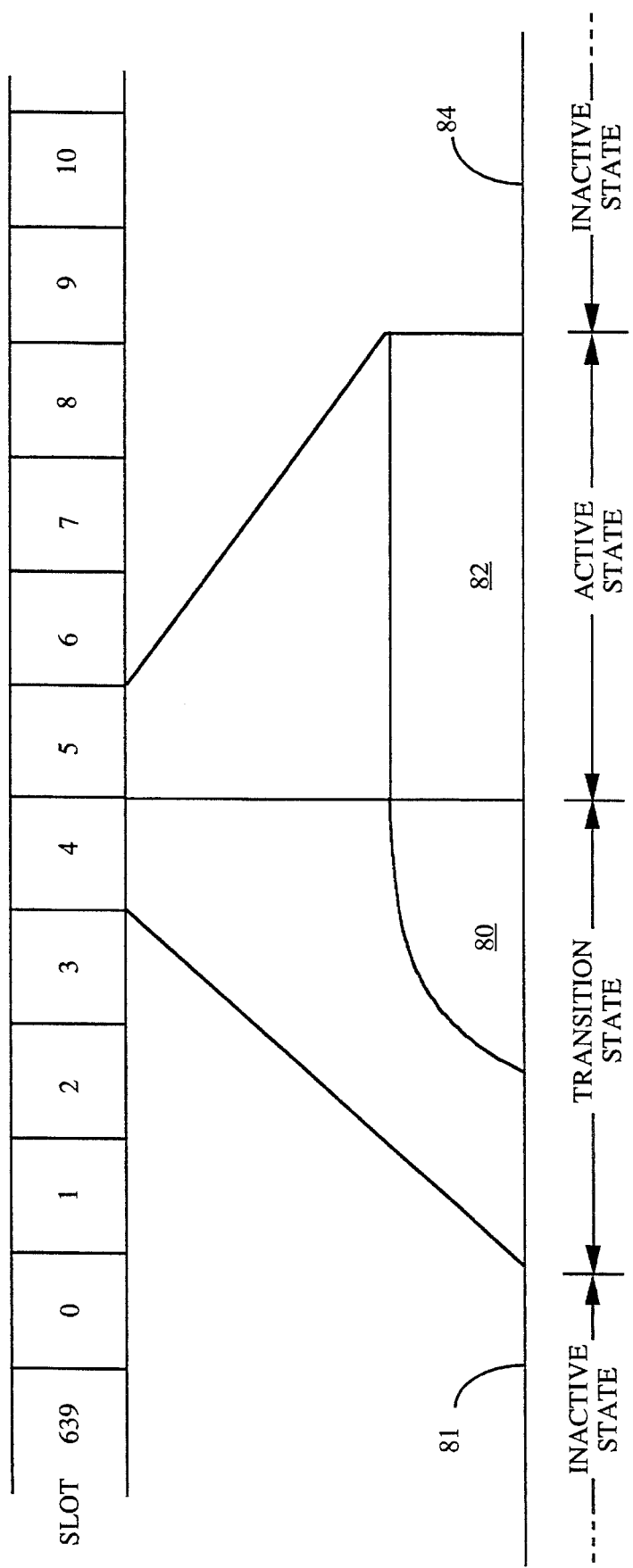
FIG. 4 illustrates the transition from the inactive state to the active state at the assigned slot of a receiver.

The transition state 80 is shown in FIG. 4 beginning in slot$_4$, the slot preceding the active slot, slot$_5$. The receiver is in the inactive state 81 before this time. During slot$_5$, the receiver in is the active state 82, and returns to inactive state 84 at the end of slot$_5$. In the absence of conditions discussed below, a receiver is in the active state only during its active slot.

Figure 2C:
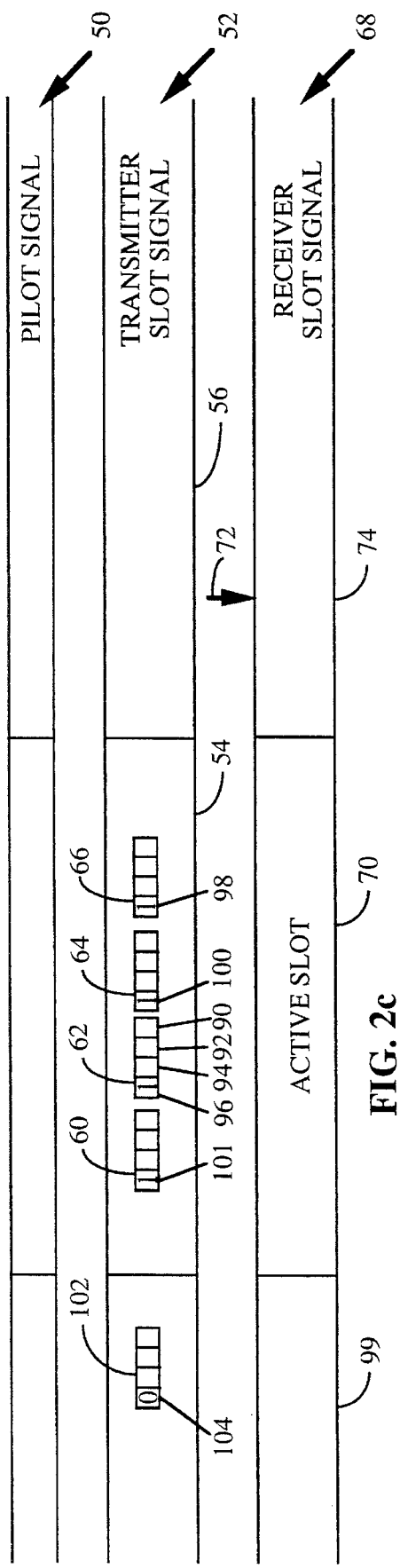

Returning to FIG. 2c, which shows the signals at a point in time later than that of FIG. 2b, receiver slot signal 68 is completely synchronized to transmitter slot signal 52. The receiver has reacquired and is tracking pilot signal 50. The receiver is in the active state because it is prepared to receive a message in active slot 70 at arrow 72.

Figure 2D:
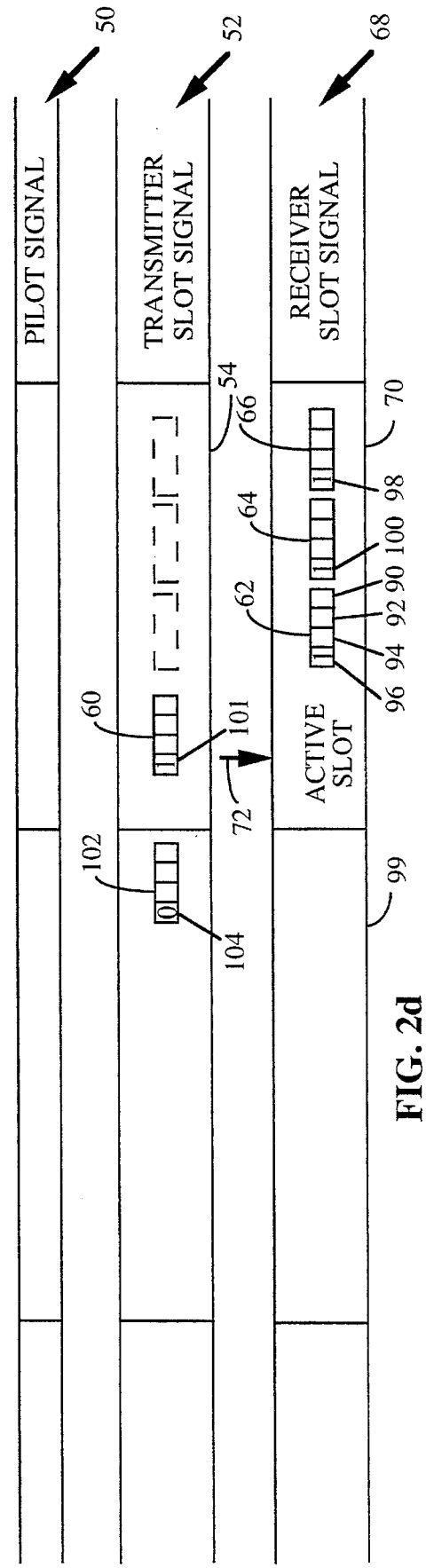

At the point in time represented by FIG. 2d, the receiver is receiving message 60. It has already received messages 62, 64, and 66. Each message may have several fields, for example, fields 90, 92, 94, and 96 of message 62. The fields contain the address of the receiver and instructions for the receiver. The field may contain system parameters for use by the receiver. Alternatively, the message field may contain the phone number when the transmitter is "paging" the receiver. The receiver decodes each message and may perform one or more actions according to the values contained in the fields.

Figure 3:
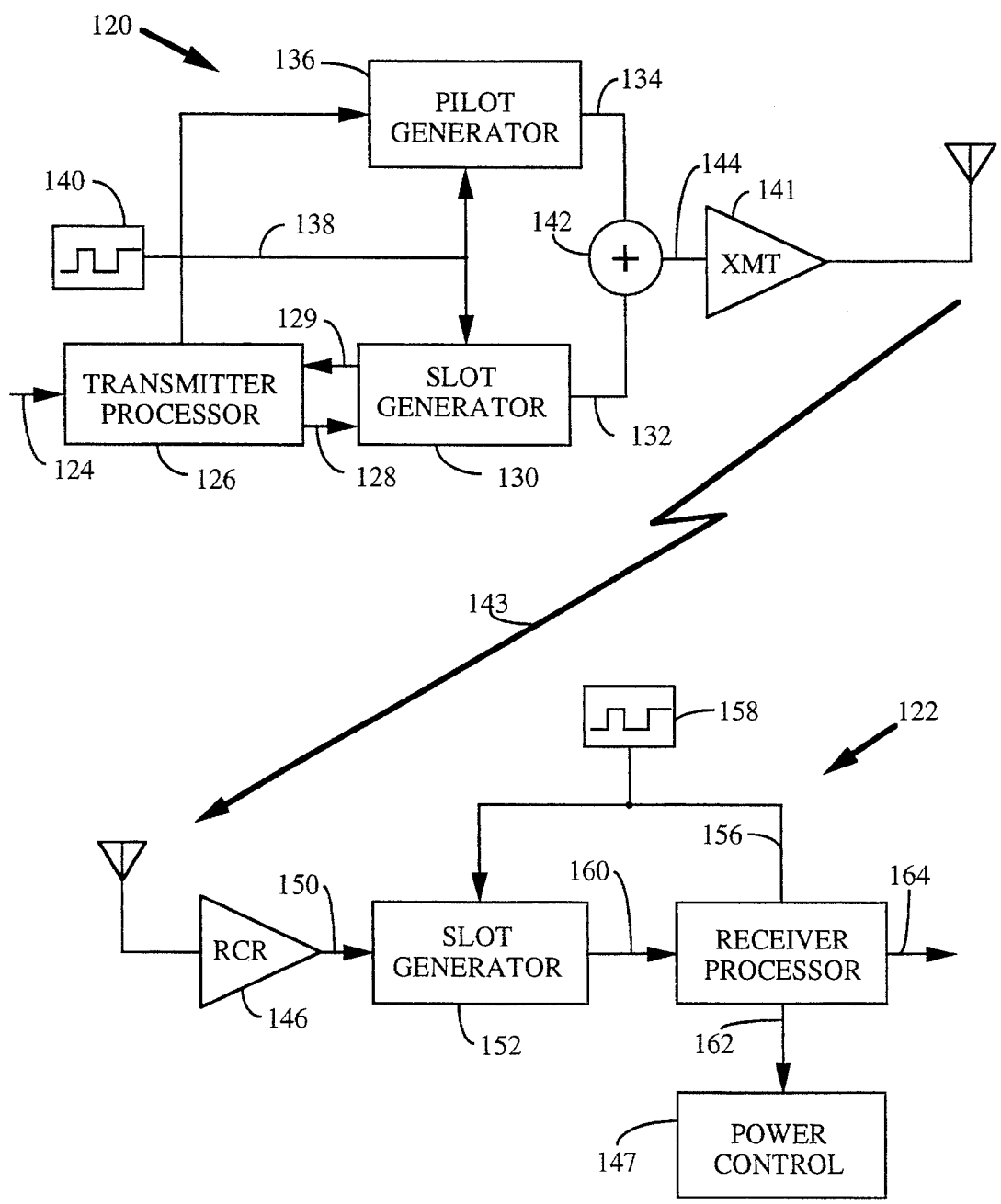
FIG. 3 illustrates an embodiment of the present invention having a message channel and a pilot channel.

FIG. 3 shows a block diagram of a system for generating the signals described in FIGS. 2a–2d. The system comprises base station transmitter 120 and mobile station receiver 122. A user (not shown) may, for example, initiate a call to the mobile station having receiver 122. In a cellular telephone system, such a call is received at the MTSO (not shown) and includes the telephone number of the mobile station being called. The MTSO routes the call to a base station. The MTSO obtains the mobile station ESN and slot cycle in response to the telephone number of the mobile station. The MTSO then provides the base station with input information 124, which includes the ESN and slot cycle of the mobile station. Information 124 is received by the transmitter processor 126, which may be a microprocessor or other control circuitry. Processor 126 may use the hash function of Equations 1 above to obtain the assigned slot of the mobile station.

Transmitter slot signal generator 130 generates an active slot signal 129, which may interrupt processor 126 when processor 126 must provide messages 128, i.e., a short time before the active slot. Transmitter slot signal generator 130 may have a counter for maintaining a slot count. Alternatively, the count may be maintained by processor 126. Transmitter slot signal generator 130 synchronizes messages 128 to the system dock 138, which is generated by transmitter clock source 140. Pilot signal generator 136 generates pilot signal 134, which is also synchronized to system clock 138. Summer 142 adds pilot signal 134 to synchronized message signal 132 and provides the sum signal 144 to a paging channel transmitter 141. Paging channel transmitter 141 broadcasts the transmitted messages 143.

In the mobile station receiver 122, paging channel receiver 146 receives transmitted messages 143. In the inactive mode, the power controller 147 may remove power from one or more components, such as receiver 146. Received message signal 150 is provided to receiver slot signal generator 152. In the inactive mode, receiver slot signal generator 152 maintains the slot count in synchronization with local clock signal 156, which is generated by receiver clock source 158. In the active mode, receiver slot signal generator 152 extracts the messages and pilot signal from received message signal 150 and provides synchronized messages 160 in synchronization with the pilot signal. Synchronized messages 160 are provided to processor 162, Processor 162 provides output signals 164 in response to the messages. Signals 164 alert the mobile station to the type of action it must perform. For example, the mobile station may activate a "traffic" channel for conducting subsequent voice communication in response to signals 164 that alert it to the presence of an incoming call.

Each message may have a MORE_PAGES field, which indicates to the receiver whether an additional message will be transmitted following the current message. A zero in this field indicates that there are no additional messages. If the receiver decodes a zero in the MORE_PAGES field, it may then immediately enter the inactive state without waiting until the end of the current slot. If the message has a nonzero value in the MORE_PAGES field, the receiver remains in the active state. If a message having a nonzero value in the MORE_PAGES field is received at the end of the active slot, the receiver may remain in the active state into the slot following the assigned slot. It is preferred that the receiver remain in the active state no longer than two slots so that the receiver does not waste power by being active. This is in case the message containing a MORE_PAGES field equal to "0" was received in error and discarded.

In FIG. 2d, message 66 has a nonzero value of "1" in MORE_PAGES field 98. Therefore, the receiver remains in the active state to receive message 64, which has a nonzero value of "1" in MORE_PAGES field 100. The receiver remains in the active state to receive message 62, which has a nonzero value in MORE_PAGES field 96. Similarly, the receiver remains active to receive message 60, which occurs at the end of the active slot 70. The receiver remains in the active state after slot 99 reaches arrow 72 because MORE_PAGES field 101 of message 60 has a nonzero value of "1." The receiver receives message 102 at the beginning of slot 99. The receiver may enter the inactive state after receiving message 102 because MORE_PAGES field 104 of message 102 has a value of "0."

Messages may include an address field having the ESN of the receiver and one or more action fields instructing the receiver to perform other actions. The receiver performs any actions that occur in messages having the receiver's ESN. Alternatively, the addressing function may be performed by the transmitter sending the phone number. In this case, the receiver performs any actions that occur in messages having a phone number assigned to the receiver. These actions may direct the receiver to remain active to receive additional messages. Since the receiver now receives all slots, these messages can be sent at any time. The actions may direct a receiver to become active for a while and then enter the slotted mode of operation. In FIG. 5a, the receiver (not shown) receives a message 110 during active slot 112 of slot cycle "n." Message 110 has an address field 220, which contains an address 222. Message 110 also has an action field 224, which contains an instruction 226. If address 122 corresponds to the ESN of the receiver, the receiver performs instruction 226.

Instruction 226 may direct the mobile station to update system parameters or "overhead" information. A message directing the mobile station to update the overhead information may also have one or more fields containing "sequence numbers." The receiver reads the sequence number contained in each such field and stores the value. When the next message containing such a sequence number is received during the next slot cycle, the receiver reads the sequence number in each sequence number field and compares them to the corresponding sequence numbers that were previously stored, usually during the previous slot cycle. If any of the sequence numbers have changed, the receiver provides an indication to the processor in the mobile station with which it is associated to update the overhead information.

In FIG. 5a, the message has sequence number field 114, which contains a sequence number 228. The receiver stores sequence number 228 in a location corresponding to the sequence number field 114. FIG. 5b represents the next slot cycle, slot cycle "n+1." The receiver receives a message 116 during active slot 112, which contains sequence number 230 in sequence number field 118. Sequence number field 118 corresponds to sequence number field 114 of message 110 received during the previous slot cycle. The receiver compares sequence numbers 228 and 230 and, if different, provides an indication to the processor (not shown) that the mobile station is to remain in the active state. The receiver may then wait for additional messages having the new overhead information or perform any other action as directed by the processor. The receiver need not perform any additional action if the values in corresponding sequence number fields of messages received in successive slot cycles remain unchanged.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A method of communicating between a first transceiver and a second transceiver each occasionally providing an output signal and receiving an input signal by scheduling potential communication between said first transceiver and said second transceiver during an active set of time slots wherein said active set of time slots is a subset of a set of all available time slots, comprising the steps of:

determining independently at said first transceiver said active set of time slots based on a predetermined number;

determining independently at said second transceiver said active set of time slots based on said predetermined number; and monitoring at said first transceiver said output signal of said second transceiver during at least said active set of time slots wherein said output signal of said second transceiver intermittently comprises a message intended for said first transceiver and said output signal of said second transceiver intermittently comprises a message intended for at least a third transceiver.

2. The method of communicating of claim 1 further comprising the steps of:

having at said second transceiver information;

providing a message comprising said information intended for said first transceiver as said output signal from said second transceiver in a particular time slot of said active set of time slots; and receiving said message at said first transceiver.

3. The method of communicating of claim 1 wherein said predetermined number is an identification number of said first transceiver.

4. The method of communicating of claim 1 further comprising the steps of:

providing a second number in a message as said output signal from said first transceiver;

receiving said message at said second transceiver;

determining the quantity of time slots in said active set of time slots based on said second number at said first transceiver; and determining the quantity of time slots in said active set of time slots based on said second number at said second transceiver.

5. The method of claim 2 wherein said information indicates that there are no more pertinent messages corresponding to said particular time slot further comprising the step of ceasing to monitor at said first transceiver said output signal of said second transceiver during said particular time slot.

6. The method of claim 2 wherein said information indicates that there is at least one more message corresponding to said particular time slot further comprising the step of continuing to monitor at said first transceiver said output signal of said second transceiver after the completion of said particular time slot.

7. The method of claim 4 further comprising the steps of:

providing an updated second number in an update message as said output signal from said first transceiver;

determining a new quantity of time slots in said active set of time slots based on said updated second number at said first transceiver; and monitoring at said first transceiver said output signal of said second transceiver during said new quantity of time slots in said active set.

8. The method of claim 7 further comprising the steps of:

receiving said update message at said second transceiver; and determining a new quantity of time slots in said active set of time slots based on said updated second number at said second transceiver.

9. The method of claim 1 wherein said output signal from said first transceiver and said output signal from said second transceiver are spread spectrum communication signals.

10. The method of claim 1 wherein said second transceiver transmits a pilot signal and said first transceiver uses said pilot signal to synchronize said active set of time slot in said first transceiver to said active set of time slots in said second transceiver.

11. The method of claim 3 wherein said identification number of said first transceiver is an electronic serial number unique to said first transceiver.

12. The method of claim 2 wherein said identification number reflects a phone number of said first transceiver.

13. An apparatus for communicating between a first transceiver and a second transceiver each occasionally providing an output signal and receiving an input signal by scheduling potential communication between said first transceiver and said second transceiver during an active set of time slots wherein said active set of time slots is a subset of a set of all available time slots, comprising the steps of:

means for determining at said first transceiver said active set of time slots based on a predetermined number;

means for determining at said second transceiver said active set of time slots based on said predetermined number; and means for monitoring at said first transceiver said output signal of said second transceiver during at least said active set of time slots wherein said output signal intermittently comprises a message intended for said first transceiver and intermittently comprises a message intended for at least a third transceiver.

14. The apparatus of claim 13 wherein said predetermined number is an identification number of said first transceiver.

15. The apparatus of communicating of claim 13 further comprising the steps of:

means for providing a second number in a message as said output signal from said first transceiver;

means for receiving said message at said second transceiver;

means for determining the quantity of time slots in said active set of time slots based on said second number at said first transceiver; and means for determining the quantity of time slots in said active set of time slots based on said second number at said second transceiver.

16. A method of communicating between a first transceiver and a second transceiver, wherein said second transceiver transmits an information signal during a cyclical series of time slots, comprising the steps of:

determining at said first transceiver an assigned slot within said cyclical series of time slots;

determining at said first transceiver a quantity of active time slots;

determining at said first transceiver a set of active slots comprising said quantity of active slots wherein one of said active slots is said assigned slot; and receiving said information signal from said second transceiver at said first transceiver during at least said active set of time slots within each said cyclical series of time slots wherein said information signal intermittently comprises a message intended for said first transceiver and intermittently comprises a message intended for at least a third transceiver.

17. The method of communicating of claim 16 wherein during a first active time slot said information signal comprises a message for said first transceiver further comprising the step of decoding by said first transceiver at said information signal to retrieve said message.

18. The method of communicating of claim 16 further comprising the step of providing said quantity of active time slots as said output signal from said first transceiver.

19. The method of claim 16 wherein said information signal from second transceiver received at said first transceiver during a particular active time slot indicates that there are no more pertinent messages in said information signal corresponding to said particular time slot further comprising the step of ceasing to monitor at said first transceiver said information signal of said second transceiver during said particular time slot.

20. The method of claim 16 wherein said information signal from second transceiver received at said first transceiver during a particular active time slot indicates that there is at least one more message corresponding to said particular time slot further comprising the step of continuing to monitor at said first transceiver said output signal of said second transceiver during a time slot following said particular active time slot.

21. The method of claim 16 further comprising the steps of:

providing a new quantity of active time slots from said first transceiver; and monitoring at said first transceiver said information signal of said second transceiver during said new quantity of time slots in said active set.

22. The method of claim 16 wherein said information signal is a spread spectrum communication signal.

23. The method of claim 16 wherein said second transceiver transmits a pilot signal further comprising the steps of:

receiving said pilot signal at said first transceiver; and synchronizing said cyclical series of time slots to said pilot signal in said first transceiver.

24. The method of claim 16 wherein said an assigned slot is determined based on an identification number of said first transceiver.-

25. The method of claim 24 wherein said identification number reflects a phone number of said first transceiver.

26. The method of claim 24 wherein said identification number reflects an electronic serial number unique to said first transceiver.

27. A first transceiver for communicating between said first transceiver and a second transceiver, wherein said second transceiver transmits an information signal during a cyclical series of time slots, said first transceiver comprising:

means for determining at said first transceiver an assigned slot within said cyclical series of time slots;

means for determining at said first transceiver a quantity of active slots;

means for determining at said first transceiver a set of active slots comprising said quantity of active slots wherein one time slot....of said set of active slots is said assigned slot; and means for receiving said information signal from second transceiver during said set of active slots within each cycle of said cyclical series of time slots wherein said information signal intermittently comprises a message intended for said first transceiver and intermittently comprises a message intended for at least a third transceiver.

28. The apparatus for communicating of claim 27 wherein said assigned slot is based on an identification number of said first transceiver.

29. The apparatus for communicating of claim 27 further comprising means for providing said quantity of active time slots as said output signal from said first transceiver.

30. The apparatus of claim 27 further comprising the steps of:

means for providing a new quantity of active time slots from said first transceiver; and means for monitoring at said first transceiver said information signal of said second transceiver during said new quantity of time slots in said active set.

31. The apparatus of claim 27 wherein said information signal is a spread spectrum communication signal.

32. The apparatus of claim 27 wherein said second transceiver transmits a pilot signal further comprising:

means for receiving said pilot signal at said first transceiver; and means for synchronizing said cyclical series of time slots to said pilot signal in said first transceiver.

33. The apparatus of claim 27 wherein during a first active time slot said information signal comprises a message for said first transceiver further comprising means for decoding at said information signal to retrieve said message.

34. A method for communicating with a remote station from a local station, wherein said remote station is periodically available for communication at a given rate for a segment of time, comprising the steps of:

determining at said local station an assigned time slot based on a predetermined number;

receiving at said local station from said remote station an index number indicating said given rate;

determining at said local station from said assigned time slot and said index number a set of active time slots during which said remote station is available for communication; and transmitting from said local station a message comprising a first message intended for said remote station and a second message intended for a second remote station during a time slot of said active set of time slots.

35. The method of claim 34 wherein said step of determining said assigned time slot, comprises the steps of:

dividing all time into a cyclical set of a fixed number of time slots;

receiving from said remote station said predetermined number; and calculating said assigned slot using a hash function wherein the input to said hash function is said predetermined number and wherein said hash function provides a number less than or equal to said fixed number.

36. A local communication station for communicating with a remote station, wherein said remote station is periodically available for communication at a given rate for a segment of time, said local communication station comprising:

means for receiving from said remote station an identification number of said remote station and an index number indicating said given rate;

a transmitter processor for determining at said local station an assigned time slot based on said identification number;

a slot generator for determining from said assigned time slot and said index number a set of active time slots during which said remote station is available for communication; and a transmitter for transmitting a message intended for said remote station and a second message intended for at least a second remote station during a time slot of said active set of time slots.

37. The local station of claim 36 further comprising pilot generator for generating a synchronization signal wherein said transmitter is further for transmitting said synchronization signal to said remote station.

* * * * *